United States Patent [19]

Schulz et al.

[11] 4,331,284

[45] May 25, 1982

[54] METHOD OF MAKING DIFFUSION BONDED AND SUPERPLASTICALLY FORMED STRUCTURES

[75] Inventors: David W. Schulz, Hermosa Beach; Vene L. Darby, Redondo Beach, both of Calif.

[73] Assignee: Rockwell International Corporation, El Segundo, Calif.

[21] Appl. No.: 130,505

[22] Filed: Mar. 14, 1980

[51] Int. Cl.³ .................... B23K 20/14; B23K 20/22
[52] U.S. Cl. .................................. 228/157; 228/118; 228/173 A; 228/193
[58] Field of Search .................. 228/118, 157, 173 A, 228/193

[56] References Cited

U.S. PATENT DOCUMENTS

| 3,927,817 | 12/1975 | Hamilton et al. | 228/157 |
| 3,934,441 | 1/1976 | Hamilton et al. | 72/364 X |
| 4,087,037 | 5/1978 | Schier et al. | 228/157 X |
| 4,220,276 | 9/1980 | Weisert et al. | 228/157 X |

*Primary Examiner*—Gus T. Hampilos
*Attorney, Agent, or Firm*—Charles T. Silberberg

[57] ABSTRACT

An improvement is disclosed to the method of making metallic structures from a plurality of stacked workpieces or blanks by joining first portions, preferably by diffusion bonding, of the stack and by clamping the joined stack at its periphery between forming members and superplastically forming second portions of said plurality of stacked blanks by the selective application of fluid under pressure. The improvement is a method of coupling the fluid to the second portions of the stack which comprises providing a first port through one of the outer blanks at the periphery of the stack. At least one stopoff path is provided for coupling the first port to the second portions of the stacked blanks, which are to be superplastically formed. A second port is provided in one of the forming members, which couples the first port to a source of pressurized fluid. Where there are at least three blanks in the stack, a slot is provided within the inner blank or blanks of the stack coupling the first port to the at least one stopoff path. Additionally, a hollow tubular member may be inserted into the slot. A hole is drilled through one wall of the tubular member, thus, coupling the interior thereof to the first port. In another embodiment, a groove in the second forming member aligned with the first port is provided, such that upon the application of pressure to the first port, the second blank is expanded within the groove forming an additional passageway coupling the first port to the at least one stopoff path.

4 Claims, 12 Drawing Figures

METHOD OF MAKING DIFFUSION BONDED AND SUPERPLASTICALLY FORMED STRUCTURES

BACKGROUND OF THE INVENTION

1. Field of Invention

The invention relates to the field of metal forming, and particularly to an improvement to the method of making metallic structures by superplastic forming and diffusion bonding.

2. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example, some titanium alloys, such as Ti-6Al-4V, have been observed to exhibit superplastic characteristics.

Until the advent of viable superplastic forming techniques, taking advantage of this property to form complex configurations requiring large tensile elongations was extremely difficult or, in some instances, not possible. A significant breakthrough in superplastic forming was made by Hamilton, et al., disclosed in U.S. Pat. No. 3,934,441, Controlled Environment Superplastic Forming, incorporated into this specification herewith by reference. Simplified, the process involves placing a metal blank workpiece over a cavity in a chamber. The blank is heated to a temperature where it exhibits superplastic characteristics after which pressure is applied to the blank, causing it to stretch and form into the cavity.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, Method of Making Metallic Sandwich Structures, by Hamilton, et al., and is herein also incorporated by reference.

Basically, the Hamilton, et al. method for making metallic sandwich structures involves fabricating the structures from a plurality of metal blank workpieces. One or more of the blanks are coated with stopoff in selected areas not to be diffusion bonded. The blanks are positioned in a stacked relationship and placed in a die assembly wherein the stack is clamped at its periphery forming a seal thereabout. The stack is diffusion bonded together in the uncoated areas by the application of pressure, and at least one of the blanks is superplastically formed against one or more of the die surfaces forming the sandwich structure. The core configuration is determined by the location, size and shape of the joined areas. In the Hamilton, et al. method, means must be provided to couple the pressurized fluid to the untreated areas of the blanks during the step of superplastically forming. Hamilton, et al. use inflation tubes. For example, if the stack consists of three blanks, the middle blank would be notched while a groove would be machined into the inward facing surface of the lower outer blank. Thus, when the blanks are assembled into a stack, a recess is formed comprising the notch in the middle blank, the groove in the bottom blank, and the inward facing surface of the top blank. A stopoff path is provided to couple the treated areas to the recess. The inflation tube is inserted into this recess, and the stack is then tacked or spot welded together at its periphery.

This procedure does not lend itself to high production runs, for it is time consuming and expensive to fabricate the recess and to install the tubes. This is especially true if the sandwich structure is of a complex configuration requiring several such tubes to be installed. The tubes also make it difficult to handle the stack during subsequent forming steps. Furthermore, a good seal between the stack and the tube is not accomplished until the stack has been clamped and heated within the forming members, at which point the metal in the stack will flow about the tube forming a seal.

An additional problem is that care must be taken to ensure that localized compressive forces do not crush the tube. It is a normal procedure to seal the periphery of the stack at its top and bottom by providing sharp, hard projections that run continuously around the perimeter of the forming members. When using the inflation tube method, these projections must be interrupted or reduced in height in the areas over the inflation tubes lest the high localized loading crush the tube. Typical examples of the use of such projection is disclosed in U.S. Pat. No. 3,934,441, Controlled Environment Superplastic Forming by Hamilton, et al.

A method that eliminates inflation tubes is disclosed in British Pat. No. 1,398,927, Joining and Forming Sheet Metal Members by Summers, et al. Summers, et al. disclose a method of diffusion bonding and superplastic forming wherein a port is provided in the die aligned with a hole in the bottom blank. Fluid pressure is applied through the hole to expand the upper workpiece. Such a procedure has two distinct disadvantages: (1) it requires that a hole be drilled in the usable part of the structure, and (2) if the stack has three or more blanks and is to have both its outer blanks expanded, then the method will not work, because equal pressure will always exist on either side of the bottom blank having the hole.

Also of interest is U.S. Pat. No. 4,087,037, Method of and Tools for Producing Superplastically Formed and Diffusion Bonded Structures by J. F. Schier, et al. Schier, et al. disclose a SPF/DB method limited to two workpieces in the stack. The step of superplastic forming is accomplished first by welding the periphery of the two workpieces together and providing a port coupling the interior of the stack to a source of pressurized fluid. While a port near the periphery is disclosed, Schier, et al. do not contemplate coupling to a stopoff path. Without the use of a stopoff, the periphery of the stack, where a port would ideally be located, cannot be clamped between a pair of forming members for the pathway to the area to be superplastically formed would be blocked off.

It is, therefore, a primary object of this invention to provide a lower cost method of making metallic sandwich structures by superplastic forming and diffusion bonding.

It is another object of this invention to provide a method of making metallic sandwich structures by superplastic forming and diffusion bonding suitable for use in high production runs.

It is a further object of the invention to provide an improved method of making metallic sandwich structures by superplastic forming and diffusion bonding by eliminating the use of inflation tubes.

SUMMARY OF THE INVENTION

The invention is an improvement to the method of making metallic structures. Typically, such structures are made from a plurality of stacked workpieces or blanks in a stack by joining first portions, preferably by diffusion bonding, of the stack and clamping the joined stack at its periphery between forming members and superplastically forming second portions of the joined stack by the application of fluid under pressure. The improvement is a method of providing a flow path from the source of fluid to the second portions of the stack, which comprises providing a first port through one of the outer blanks at the periphery of the stack. At least one stopoff path is provided for coupling the first port to the second portions of the stacked blanks. A second port is provided in one of the forming members which couples the first port to the fluid under pressure.

In a second embodiment, where there are at least three blanks in the stack, a slot is provided within the inner blanks of the stack, coupling the first port to the at least one stopoff path. Additionally, a hollow tubular member can be inserted into the slot having a hole drilled through one wall coupling the interior thereof to the first port. The use of the tubular member insures the coupling of the first port to the at least one stopoff path.

In a third embodiment, a groove is provided in the second forming member substantially aligned with the first port, such that upon the application of pressure to the first port the second outer blank is expanded within the groove forming a passageway coupling the first port to the at least one stopoff path.

The novel features which are believed to be characteristic of the invention, both as to its organization and its method of operation, together with further objects and advantages thereof, will be better understood from the following description in connection with the accompanying drawing in which presently preferred embodiments of the invention are illustrated by way of examples. It is to be expressly understood, however, that the drawings are for purposes of illustration and description only, and are not intended as a definition of the limits of the invention.

DESCRIPTION OF PREFERRED EMBODIMENTS

Figure 1:
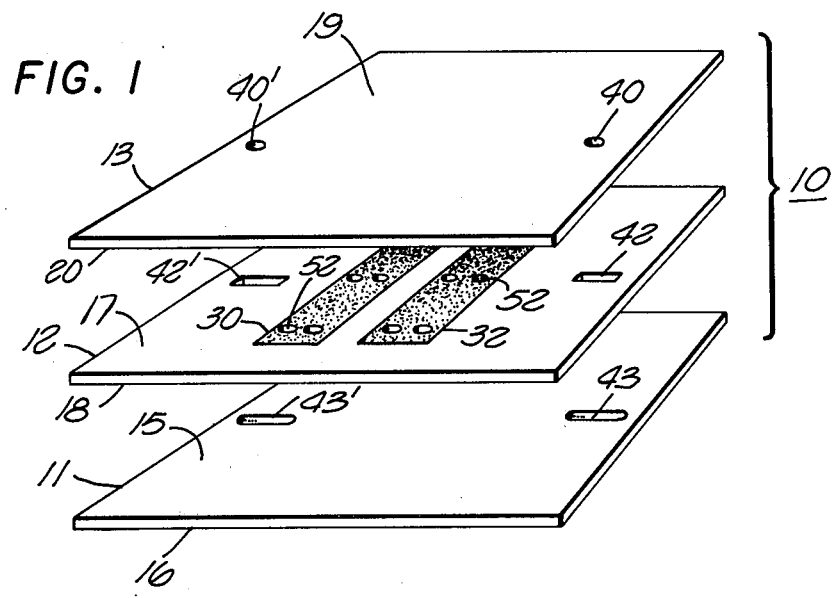
FIG. 1 illustrates an exploded perspective view of a three piece metal workpeice assembly treated for selective diffusion bonding prior to insertion in a die assembly.

Illustrated in FIG. 1 is an exploded perspective view of a stack 10, made up of metal workpieces or blanks 11, 12, and 13, which are to be formed into a sandwich structure according to the present invention. The blanks 11, 12, and 13 are shown stacked together in FIG. 2, and are, preferably, in the form of sheets having upper and lower opposed principal surfaces 15 and 16, 17 and 18, and 19 and 20, respectively. The number of blanks used will vary depending upon load conditions and design requirements. However, a minimum of two blanks must be utilized and normally three or more blanks would be used. The metal blanks must have the ability to be joined by such methods as brazing, welding, or diffusion bonding. At least one of the outer blanks and most likely the inner blanks must have an effective strain rate sensitivity, i.e., exhibit superplastic properties at the desired forming temperatures, and, preferably, within a temperature range required for diffusion bonding of the stack 10.

Any metal that exhibits superplastic properties within a workable temperature range can be used for such blanks, but the present invention is particularly concerned with metals that exhibit superplastic properties within the temperature range required for diffusion bonding; for example, titanium or alloys thereof, such as Ti-6Al-4V.

Figure 5:
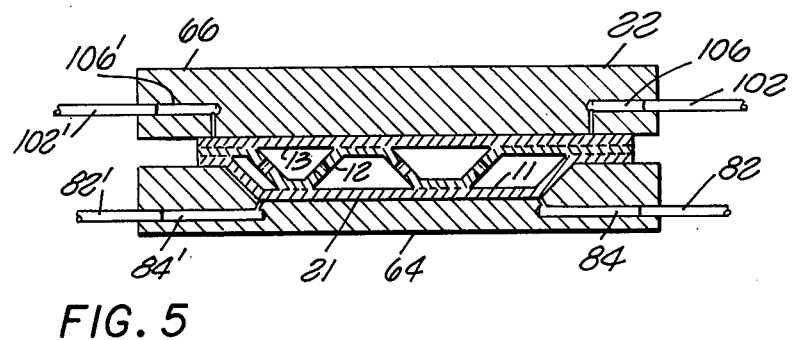
FIG. 5 illustrates a completed metallic structure enclosed in a forming member.

Illustrated in FIG. 5 is a completed metallic sandwich structure 21 enclosed in a forming member, typically in the form of die assembly 22. It can be seen that the completed sandwich structure 21 has blank 12 joined at selected locations to both blanks 11 and 13. Referring back to FIGS. 1 and 2, in order to join only at the selected locations on the blanks, a preferred procedure is to apply a suitable stopoff material to those areas within the stack 10 where no attachment or joining between the sheets is desired. Thus, areas 30 and 32 on surface 17, and areas 35, 36, and 37, of surface 18 of the blank 12 are coated with a stopoff material to prevent bonding in those areas. A preferred stopoff material is Yttria ($Y_2O_3$), in a suitable binder, which can be applied by spraying, painting or silk screen techniques.

For expansion of the stack 10 to the sandwich structure 21, shown in FIG. 5, a method of providing a path coupling the areas not to be bonded to an external source of pressurized fluid is required. The preferred method of providing this path is to incorporate ports 40 and 40' at the periphery of blank 13 coupling surface 19 to surface 20. The ports can easily be made by conventional drilling methods. Slots 42 and 42' are provided at the periphery of blank 12 coupling surface 17 to surface 18. These slots can most easily be accomplished by milling. Grooves 43 and 43' are provided on surface 15 at the periphery of blank 11. Ports 40 and 40', slots 42 and 42', and grooves 43 and 43' are positioned so that they are substantially aligned providing a flow path from surface 19 of blank 13 to surface 15 of blank 11.

Figure 4:
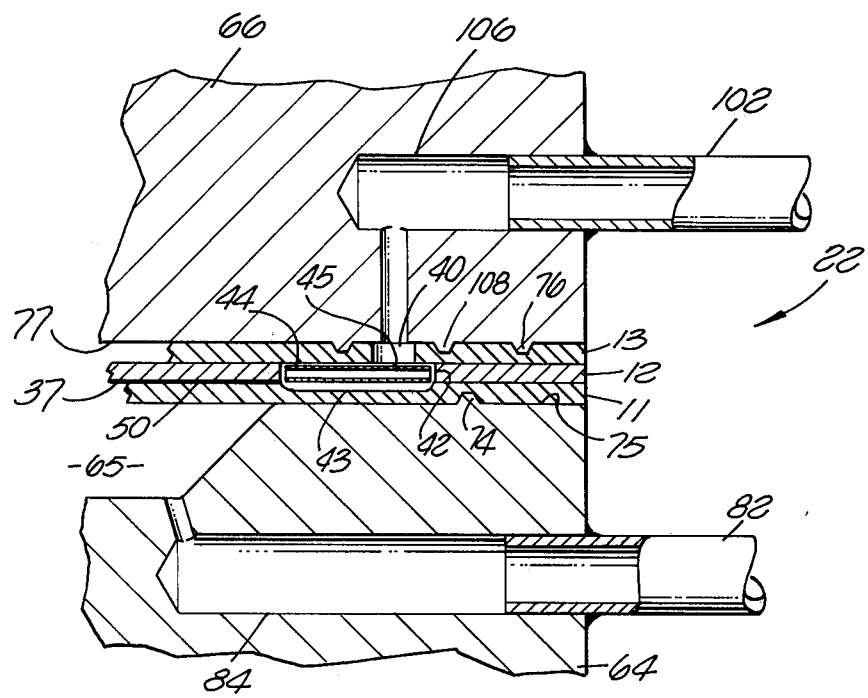
FIG. 4 illustrates an enlarged view of the right hand portion of the stack and die assembly shown in FIG. 3.

For reasons to be subsequently discussed, it is preferably (as shown in FIG. 4) to incorporate hollow tubes 44 and 44' in slots 42 and 42', respectively. Holes 45 and 45' are provided in the tubes 44 and 44', respectively, to couple ports 40 and 40' to the interior thereof. Stopoff paths 50 and 50' are provided to couple slots 42 and 42' and grooves 43 and 43' to stopoff paths 37 and 35, respectively. A plurality of small holes 52 are provided in blank 12 to interconnect the areas 30, 32, 35, 36, and 37, which are not to be diffusion bonded together. To hold the stack 10 together during subsequent forming operations, the stack 10 is usually tack welded or spot-welded together at a sufficient number of points to insure that they remain properly assembled.

Figure 3:
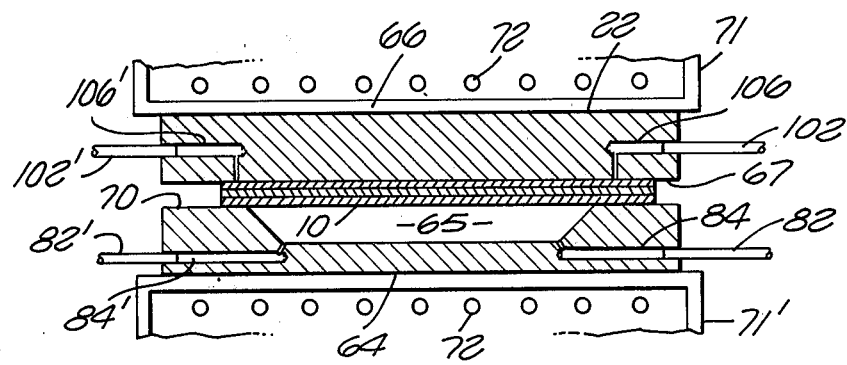
FIG. 3 illustrates the stack shown in FIG. 2 installed in a die assembly.
Figure 2:
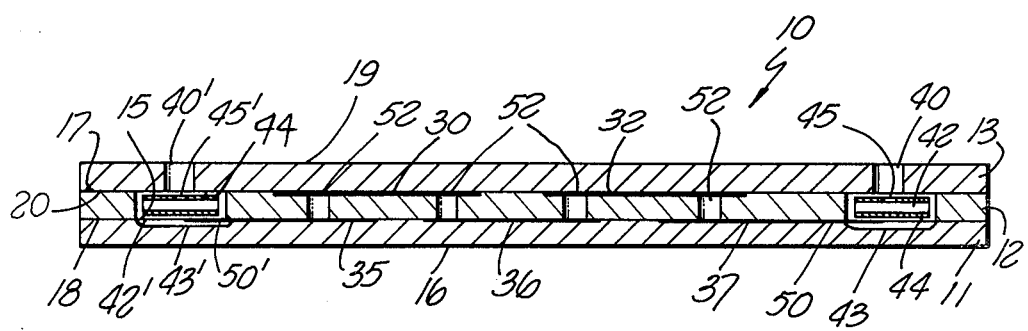
FIG. 2 illustrates a cross-sectional view of the workpieces stacked together.

Illustrated in FIG. 3 is a stack 10 shown in FIG. 2 installed within die assembly 22. Illustrated in FIG. 4 is an enlarged view of the righthand portion of FIG. 3. It can be seen from these figs. that the die assembly 22 comprises a lower forming member in the form of a die half 64 which has a cavity 65, and an upper forming member in the form of die half 66. The stack 10, which is supported on surface 70 of the lower die half 66, and the surface 76 of the upper die half 66, and the cavity 65, define the external contour of the completed sandwich structure 21, shown in FIG. 5.

Referring to FIG. 5, it can be seen that the sandwich structure 21 has both blanks 11 and 12 superplastically expanded while blank 13 remains substantially unchanged. The initial thickness of the blanks are determined by the dimensions of the part of the sandwich structure to be formed. The particular joining method to be used, namely welding, brazing, or diffusion bonding, depends upon the materials selected for the blanks, the temperature required for superplastic forming, and the desired strength. However, especially for titanium, diffusion bonding is preferred as this results in the strongest joining and the bonding temperature is generally suitable for superplastic forming.

Joining the stack 10 at selected locations by brazing or spot welding, is normally accomplished before the stack 10 is placed in the die assembly 22. When diffusion bonding, the unjoined stack 10 is, however, preferably bonded after placement in the die assembly 22, thereby saving fabrication time and equipment cost (although the stack could be diffusion bonded by conventional press or roll diffusion bonding before placing it in the die assembly 22). The weight of the upper die half 66 acts as a clamping means for the stack 10. Should it be desired, additional tightening means such as bolts (not shown) can be employed to more effectively constrain the stack 10. Another additional tightening means that could be employed is a press (not shown), preferably hydraulic, having platens 71 and 71'. The die assembly 22 is positioned between the platens 71 and 71' and compressed, thereby assuring that the stack 10 is effectively constrained. This arrangement is particularly advantageous, as the platens 71 and 71' can be made of ceramic material and resistance heated wires 72 can be provided therein for heating the stack 10 to the forming temperature.

It is important to insure that the portions of the stack 10 to be diffusion bonded and superplastically formed are sealed off from ambient air in order to prevent surface contamination at elevated temperatures. This is accomplished by providing a protrusion 74 on surface 75 and a second protrusion 76 on surface 77 of the lower and upper die halves 64 and 66, respectively, extending completely around the peripheries thereof. Thus, when the die halfs 64 and 66 are clamped about the stack 10, the protrusions 74 and 76 cause high localized loading on the blanks 11 and 13, respectively, forming indentations therein, thus providing peripheral seals.

A pair of lines 82 and 82' are provided in the lower die half 64 which are coupled to cavity 65 via orifice tubes 84 and 84', respectively. A pair of lines 102 and 102' are provided in upper die half 66 which are coupled to ports 40 and 40', respectively, of blank 13, via orifice tubes 106 and 106'. In order to prevent contamination and further to draw a vacuum therebetween, the upper die half 66 is provided with a circular protrusion 108 on surface 77 which engages surface 19 of the blank 13 and forms an indentation about the connection between the orifice tube 102 and the port 40 when the upper and lower die halfs 64 and 66 are clamped about the stack 10, providing a seal. A second protrusion (not shown) is provided about port 40' and tube 102' for the same purpose.

The details of the diffusion bonding and superplastic forming process are disclosed in U.S. Pat. No. 3,927,817, Method for Making Metallic Sandwich Structures by Hamilton, et al., and thus need not be discussed in significant detail here. Suffice it to say, after the stack 10 has been installed in the die assembly 22 and clamped in place as shown in FIG. 3 and FIG. 4, the die assembly 22 is heated to a temperature suitable for diffusion bonding and pressurized fluid is applied through lines 82 and 82' at a sufficient level to cause the blanks 11, 12, and 13 to bond together in the untreated areas. A vacuum can be drawn from the interior of the stack 10 through tubes 102 and 102' to aid in the diffusion bonding, but it is not a necessity to do so.

Figure 6:
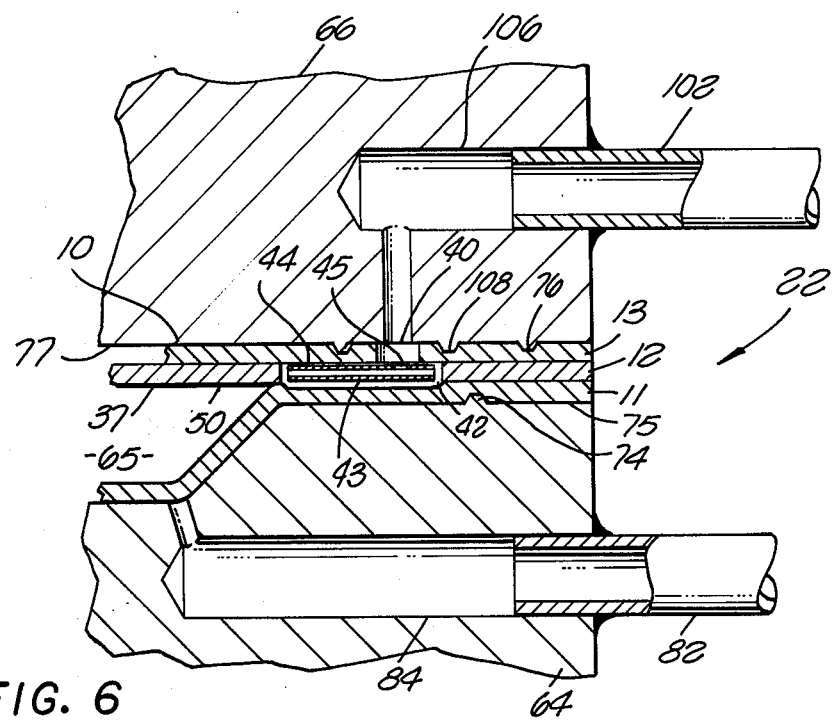
FIG. 6 illustrates an enlarged view of the right hand portion of the sandwich structure and die assembly shown in FIG. 5.

After the stack 10 has been diffusion bonded, the temperature is adjusted to a value suitable for superplastic forming (which may be identical to that required for diffusion bonding). Pressurized fluid is applied through tubes 102 and 102' while a vacuum is, preferably, drawn from cavity 65 through tubes 82 and 82'. The pressurized fluid enters the interior of the stack 10 through ports 40 and 40', passing into the interior of tubes 44 and 44' via ports 45 and 45', respectively. The pressurized fluid also enters grooves 43 and 43' and reaches stopoff paths 50 and 50', respectively, where it continues to "breakthrough" to the coated areas 30, 32, and 37, and 35, respectively and subsequently to area 36 via holes 52. The untreated areas will be forced to superplastically expand into the cavity 65 to the configuration shown in FIG. 5 and FIG. 6, (which is an enlarged view of the right hand portion of the die assembly 22 and sandwich structures 21 shown in FIG. 5).

Of course, as previously mentioned, the diffusion bonding step can be accomplished in a separate operation, either by gas, press or roll diffusion bonding, prior to superplastic forming. In such cases, the ports 45 and 45' need not be drilled in tubes 44 and 44' until after the step of diffusion bonding has been accomplished. In fact, ports 40 and 40' also need not be drilled until after diffusion bonding has been accomplished.

During the step of diffusion bonding, the force level may be so high as to cause localized metal flow in the area of the slots 42 and 42', sufficient to close off slots 42 and 42' and grooves 43 and 43' from the stopoff paths 50 and 50'. Thus, it is preferred to use tubes 44 and 44' which insures coupling of the ports 40 and 40' to stopoff paths 50 and 50'. In instances where metal flow during diffusion bonding is not significant, the tubes 44 and 44' can be eliminated. The grooves 43 and 43' are also provided to insure a fluid flow path to the stopoff paths 50 and 50', and here again, in situations where metal flow in the step of diffusion bonding is minimal, the grooves may also be eliminated. Thus, in the simplist case, only the ports 40 and 40' in the blank 13, and the slots 42 and 42' in the blank 12, are required. It should also be noted that while two flow paths to the areas to be superplastically formed are provided, in some instances only one path will be necessary, and in others, more than two may be required.

Figure 7:
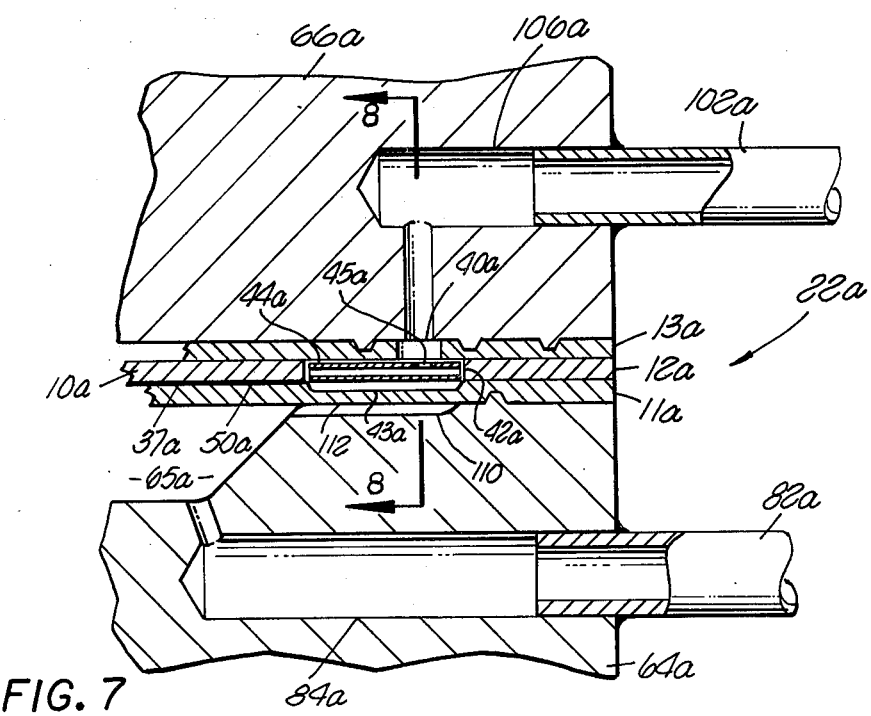
FIG. 7 illustrates an enlarged view of the right hand portion of the stack and die assembly similar to that shown in FIG. 3 further illustrating a method of providing additional coupling to stopoff paths.
Figure 8:
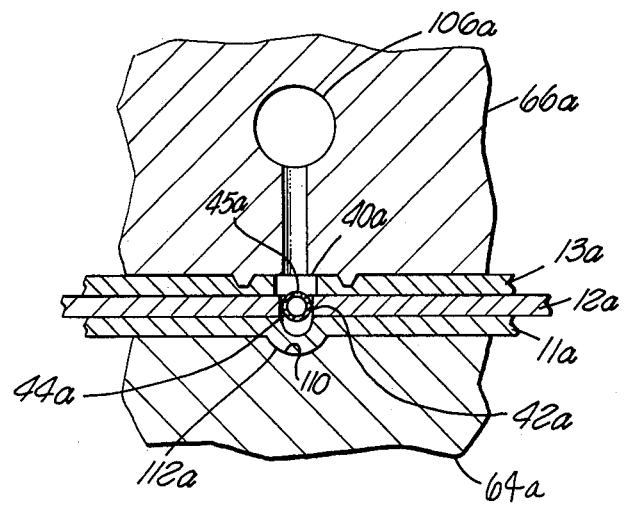
FIG. 8 is a cross-sectional view along the lines 8—8 shown in FIG. 7.

Illustrated in FIG. 7 is an enlarged view of the right hand portion of a die assembly 22a having a stack 10a installed therein similar to that shown in FIG. 3. Illustrated in FIG. 8 is a cross-sectional view of the die assembly 22a (shown in FIG. 7), along the line 8—8. Referring to FIGS. 7 and 8, it can be seen that the die assembly 22a which is similar to die assembly 22 except modified by machining or otherwise forming a groove 110 into the lower die half 64a. After diffusion bonding, superplastic forming is accomplished as in the previous examples, except that upon the application of pressurized fluid through line 102a to port 40a, in the blank 13a of the stack 10a, via orifice tube 106a, fluid pressure will force the notched portion 112 of the blank 11a into the groove 110. The drawing of a vacuum from cavity 65a can be used to aid in the expansion of the portion 112 into the groove 110. The portion 112, thus, takes on the shape of the groove 110 forming an expanded portion 112a. This provides an improved flow-path to the stopoff path 50a and in turn to the area 37a on the blank 12a. This modified configuration of die half 64a can be used in conjunction with a tube 44a, similar to tube 44, to provide additional flow-path reliability for coupling of a port 40a to the stopoff path 50a.

Figure 9:
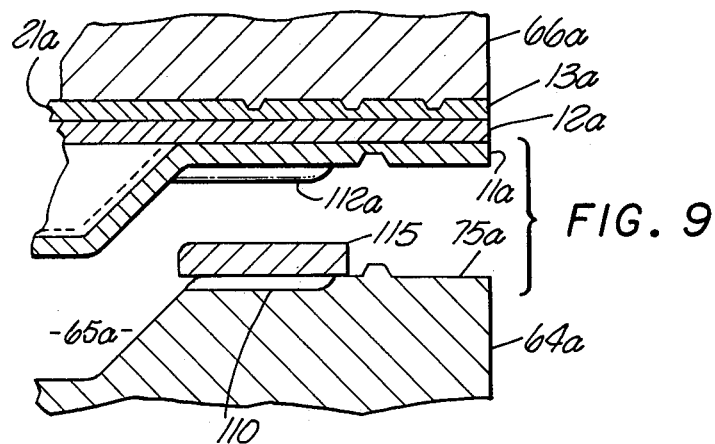
FIG. 9 illustrates a view of a portion of a completed sandwich structure removed from the cavity of a lower die half.
Figure 10:
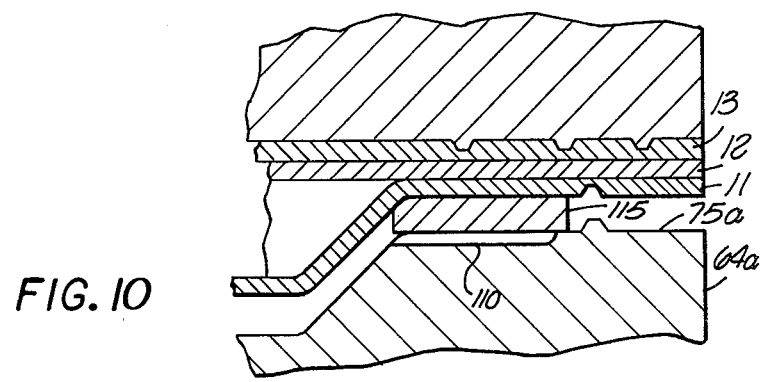
FIG. 10 illustrates the die assembly shown in FIG. 9 reassembled.

In most applications, after the sandwich structure 21a has been formed, it is desirable to eliminate the portion 112a. Illustrated in FIG. 9 is the completed sandwich structure 21a, partially lifted out of the cavity 65a of the lower die half 64a, with metal frame 115 mounted on the surface 75a of the lower die half 64a. As illustrated in FIG. 10 the upper die half 64a is then brought downward. If this is accomplished while the die assembly 22a and sandwich structure 21a are still at forming temperature, the portion 112a will be readily forced back into the position shown in FIG. 7, and thus, the expanded portion 112a is generally entirely eliminated.

Figure 11:
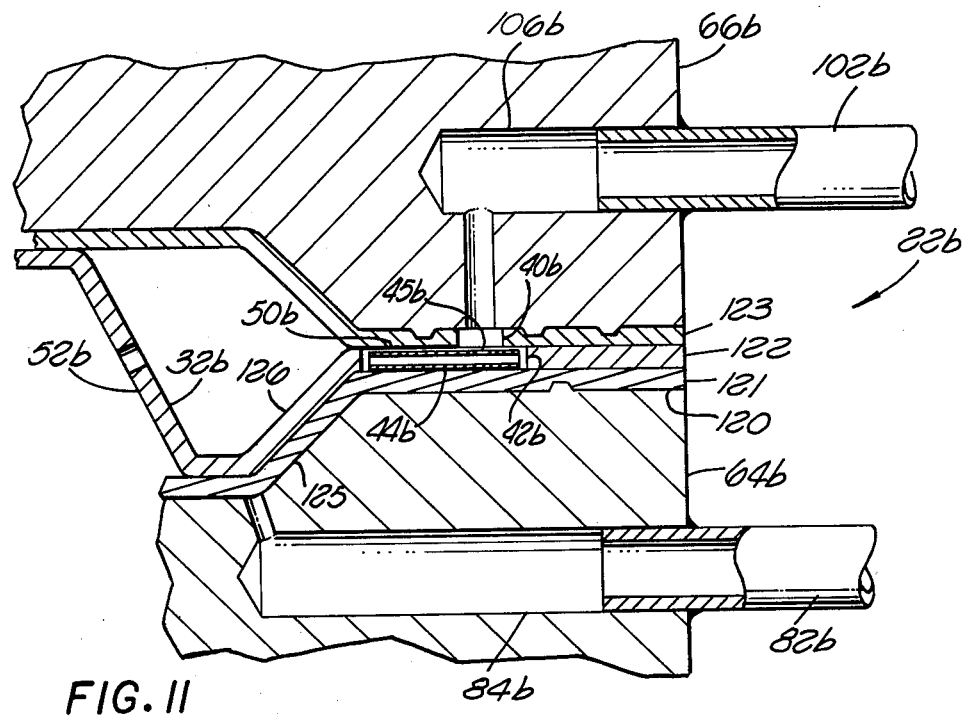
FIG. 11 illustrates a portion of a sandwich structure within a die assembly where in both outer workpieces are expanded.

Illustrated in FIG. 11 is a stack 120 having both its outer blanks 121 and 123 expanded and its inner blank 122 diffusion bonded to each of said outer blanks mounted within upper and lower die halfs 66b and 64b, respectively. As in the previous examples, pressurized fluid from line 102b is coupled to port 40b in blank 123, via orifice tube 106b. A slot 42b is provided in blank 122, aligned with the port 40b. A tube 44b, having a hole 45b therein, is placed into the slot 42b. A stopoff path 50b is provided to couple the port 40b and tube 44b to the unbonded area 37b. In this configuration, a groove is not required in blank 120, because the portions 125 and 126 of blanks 121 and 122 are bonded together. Note also, that in the cases where metal flow in the diffusion bonding step is minimal, the tube 44b may be eliminated, and, in fact, it is possible to eliminate, in some instances, the slot 42b if the stopoff path 50b is continued, as shown, to port 40b.

Figure 12:
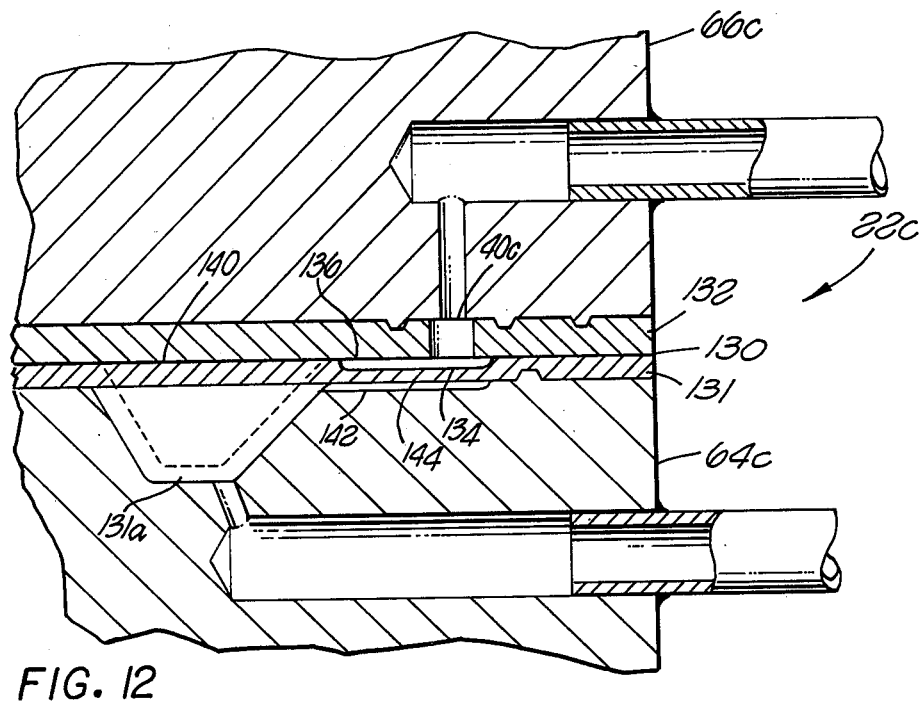
FIG. 12 illustrates a portion of a stack composed of two workpieces within a die assembly.

Illustrated in FIG. 12 is another embodiment of the invention. A stack 130, composed of blanks 131 and 132, is mounted in a die assembly 22c, comprising lower and upper die halfs 64c and 66c. In this embodiment, the blank 132 is provided with a port 40c which is coupled to a groove 134 in the blank 131. A stopoff path 136, on the blank 132, couples the port 40c and groove 134 to the area 140 between blanks 131 and 132, which are not diffusion bonded together. As in the previous cases, if the stopoff path 136 connects with the port 40c, it is possible, in cases where metal flow in the diffusion bonding step is minimal, to eliminate the groove 134. If, on the other hand, metal flow is significant, the lower die half 64c can be provided with a groove 142, similar to the groove 110 on the lower die half 64a, shown in FIG. 7. Thus, when the stack 130 is superplastically formed, the portion 144 will be expanded into the groove 142, increasing the size of the groove 134, providing a greater probability of maintaining a flow path between port 40c and stopoff path 136.

While the method of making superplastically formed and diffusion bonded structures, using the improved method of coupling the pressurized fluid to the areas to be superplastically formed, has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

Therefore, we claim:

1. In the method of making a metallic sandwich structure from three workpieces in a stack by selectively diffusion bonding first portions of said stack, clamping said stack at its periphery between first and second forming members, and superplastically forming second portions of said stack by the application of fluid under pressure, the improvement comprising:

providing a first port at said periphery of said stack through one outer workpiece of said stack;

providing at least one stopoff path coupling said first port to said second portions of said stack;

providing a slot in the inner workpiece of said stack coupling said first port to said at least one stopoff path;

providing a second port in said first forming member coupling said first port to said fluid under pressure;

providing a seal between said first forming member and said one outer workpiece sealing off said first and second ports;

providing a tubular member within said slot, said tubular member having a bore, said tubular member being positioned such that said bore is coupled to said at least one stopoff path; and making a hole through said tubular member such that said bore is coupled to said first port.

2. The method of claim 1 wherein there are stopoff paths on both sides of said inner workpiece.

3. The method of claim 1 including the additional step of providing a groove in said second forming member substantially aligned with said first port;

such that upon the application of pressure to said first port said second outer workpiece is expanded within said groove forming a passageway coupling said first port to said at least one stopoff path.

4. The method of claim 3 including the additional steps of:
   removing said sandwich structure from said second forming member;
   placing a frame about the periphery of said second forming member such that said groove is covered;
   reinstalling said sandwich structure in said second forming member; and
   clamping said first forming member in place with sufficient force so as to collapse said passageway back into said second outer workpiece.

* * * * *